United States Patent [19]

Maeda et al.

[11] Patent Number: 4,945,510
[45] Date of Patent: Jul. 31, 1990

[54] REGISTER DEVICE

[75] Inventors: Ken-ichi Maeda, Kamakura; Mitsuo Saito, Yokosuka; Takeshi Aikawa, Tokyo; Tsukasa Matoba, Kawasaki; Mitsuyoshi Okamura, Tokyo, all of Japan

[73] Assignee: Kabushiki Kaisha Toshiba, Kawasaki, Japan

[21] Appl. No.: 133,737

[22] Filed: Dec. 16, 1987

[30] Foreign Application Priority Data

Dec. 19, 1986 [JP]  Japan ................................. 61-303443

[51] Int. Cl.$^5$ ............................................... G06F 12/00
[52] U.S. Cl. ................................ 364/900; 364/933.3; 364/926.2; 364/965.4
[58] Field of Search ... 364/200 MS File, 900 MS File

[56] References Cited

U.S. PATENT DOCUMENTS

| 4,288,860 | 9/1981 | Trost | 364/900 |
| 4,370,730 | 1/1983 | Chadra | 364/900 |

OTHER PUBLICATIONS

Reduced Instruction Set Computer Architecture for TLSI; M. G. H. Katevenis, 1984.

*Primary Examiner*—Thomas M. Heckler
*Attorney, Agent, or Firm*—Oblon, Spivak, McClelland, Maier & Neustadt

[57] ABSTRACT

A register device includes a register set group, a switching control unit, a write control unit, a write flag memory unit, and a read control unit. The register set group consists of a plurality of register sets each constituted by a plurality of registers. The switching control unit selects a register set to be used in processing from the register set group in response to a saving/recovery instruction. The write control unit writes data in registers of the register set selected by the switching control unit in response to a write instruction. A write flag representing whether data is written in each of the registers is held by the write flag memory unit. The read control unit determines, in response to a read instruction, a register in which data is written most recently of a plurality of registers corresponding to each other between the register sets with reference to the write flags, thereby reading out data from the register.

9 Claims, 8 Drawing Sheets

REGISTER DEVICE

BACKGROUND OF THE INVENTION

The present invention relates to a register device used in a computer. In a computer, when a subroutine call or interruption is generated, current processing is temporarily stopped to execute another processing, and after this processing is completed, the interrupted processing is resumed. In this case, the contents of one or more registers must be saved and the saved contents must be returned to the original registers for recovery. The present invention relates to a register device having a function of performing saving/recovery of contents of registers at a high speed.

In a conventional computer system, the saving/recovery of contents of registers during processing in which a subroutine is called and processing jumps from a main routine to the subroutine, i.e., subroutine call processing and processing for returning from the subroutine to the main routine, i.e., return processing are generally processed by a program in the main routine and the subroutine using PUSH and POP instructions for handling a stack. However, a system using such a program leads to an overhead in the subroutine processing, thereby preventing a high speed operation of the subroutine processing.

In order to cope with the above problem, a system disclosed in "Reduced Instruction Set Computer Architectures for VLSI.", M.G.H. Katevenis, MIT Press, 1984, i.e., a system using a register window has been proposed. In this system, a register window is changed during the subroutine processing, thereby saving the contents of the registers. During the return processing after the subroutine processing is completed, the register window is returned to its original state to recover the saved contents of the registers. In this case, along with execution of the subroutine call, although the contents of the registers are saved, the contents of the registers before the subroutine call are all changed. Therefore, data stored in the registers in the main routine cannot be referred to in the subroutine.

Also, a system in which processing using a register window is used in combination with normal register processing is known. In this case, however, saving/recovery of contents of registers is performed using a program in the normal register processing. Therefore, an object of eliminating the overhead of the subroutine processing cannot be achieved.

The above problem significantly appears when a program in which Prolog is used as a program language is executed. That is, since Prolog processing is based on a knowledge tree structure, information stored in a register set must be saved every time the processing reaches a choice point (branch point of the knowledge tree structure), and information of a register set must remain after it is saved. In addition, if a back track, i.e., returning in the knowledge tree is generated, the register set must be recovered to a state existing at an immediately preceding choice point. That is, in nondeterministic inference processing of Prolog, such choice point processing and back tracks are frequently repeated. Therefore, the time lost during saving/ recovery of the registers largely reduces a processing speed.

As described above, according to a conventional register saving system using a program, the speed of the saving/recovery operation cannot be increased. In addition, according to a system using a register window, information concerning contents of registers after saving cannot be stored.

SUMMARY OF THE INVENTION

The present invention has been made to eliminate the above problems, and has as its object to provide a register device capable of performing saving/recovery of contents of registers at a high speed and capable of holding contents of the registers after saving.

A first register device according to the present invention comprises: a register set group having a plurality of register sets each consisting of a plurality of registers, the registers constituting the register sets corresponding to each other between the plurality of register sets; a switching control unit for switching the register sets to be used in processing in response to a saving/recovery instruction; a write flag memory unit for storing a write flag representing the presence/absence of writing with respect to the registers; and a read control unit for referring to the write flag and reading out data from a register in which data is most recently written, the register being one of the plurality of registers corresponding to each other between the plurality of register sets.

A second register device according to the present invention comprises all the elements in the above first register device and further comprises: a saving unit for saving, when a saving instruction is supplied to all of the register sets, data in a register set least recently used to a main memory; and a recovery unit for recovering the data saved to the main memory to the register set in response to a recovery instruction.

According to the present invention, when contents of registers must be saved, e.g., subroutine call processing or choice point processing is to be executed, or when contents of the registers must be recovered, e.g., return processing from a subroutine is to be executed or a back track is generated, a register set to be used is selected from a plurality of register sets. Only by such a switching operation of the register set can the saving/recovery operation be completed rapidly.

On the other hand, a write flag is set in the used register, and contents of each register are read out in accordance with a state of the write flag. For this reason, when the contents of a specific register are to be read out after switching of the register set, contents of a register corresponding to the specific register of the register set before switching are read out if no data is written in the specific register of the selected register set. Therefore, even after switching of the register set, the contents of the register of the register set before switching are substantially stored and hence can be referred to.

In addition, in a device having an arrangement for saving to a main memory and recovering therefrom, the contents of a register set which are rarely read out can be saved to the main memory so that the register set can be used again. Therefore, the above effects can be obtained with a smaller number of register sets.

According to a register device of the present invention, since the saving/recovery operation can be instantaneously performed by only switching a plurality of register sets, processing can be executed at high speed. Moreover, since the contents of the register before saving are substantially stored after saving, there can be provided an effective register device having a wide range of applications

DETAILED DESCRIPTION OF THE PREFERRED EMBODIMENTS

A register device according to embodiments of the present invention will be described below with reference to the accompanying drawings.

Figure 1:
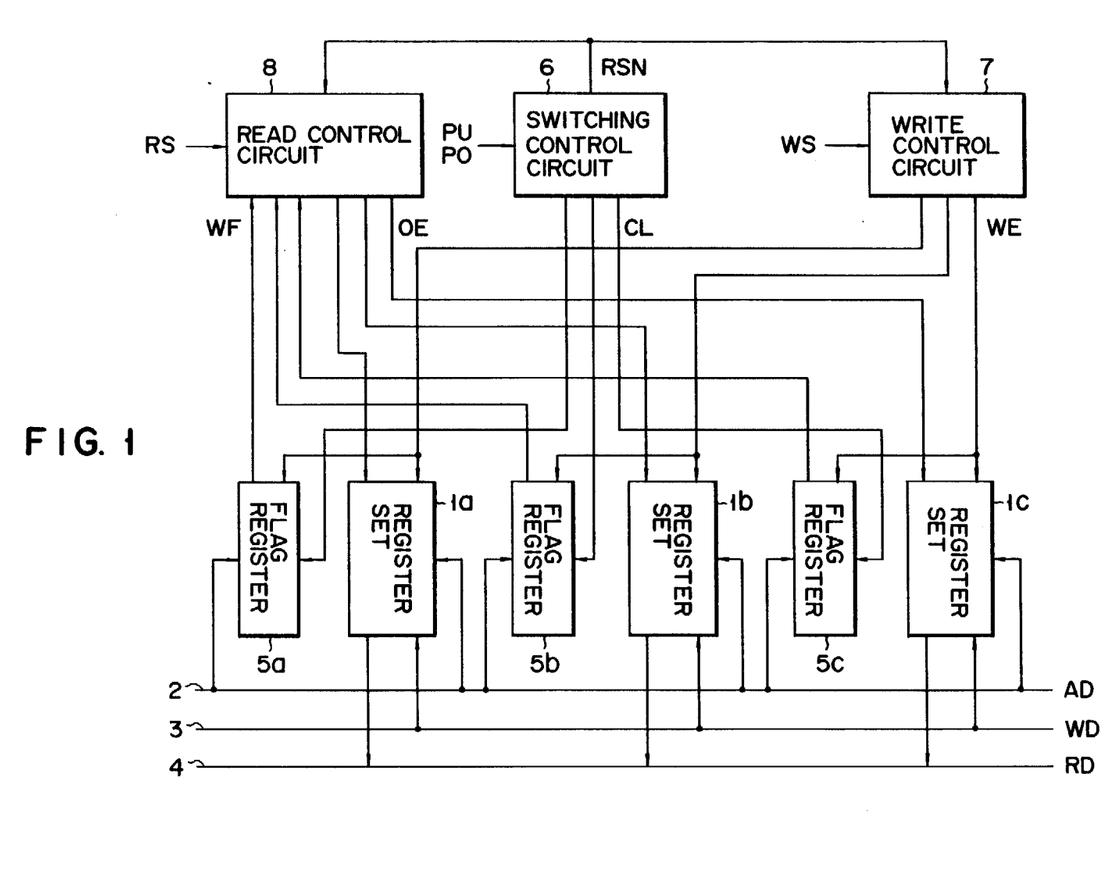
FIG. 1 is a block diagram showing an arrangement of a register device according to a first embodiment of the present invention.

A register device according to a first embodiment of the present invention shown in FIG. 1 comprises three register sets 1a, 1b, and 1c.

Sets 1a, 1b, and 1c temporarily store a calculation result of a CPU (not shown) or data read out from a memory. Each of sets 1a, 1b, and 1c is constituted by a plurality of registers and each register consists of, e.g., 16 to 32 bits. The respective registers correspond to each other between sets 1a to 1c, and predetermined priorities are given to sets 1a to 1c. Register address AD for designating a register is supplied to an address terminal of each of sets 1a to 1c through address signal line 2, write data WD is supplied to a write terminal thereof through write signal line 3, and read data RD is output from a read terminal thereof to read signal line 4. Write flag registers 5a, 5b, and 5c are provided to correspond to sets 1a, 1b, and 1c, respectively. Write flag WF is written in a memory area of each of flag registers 5a to 5c corresponding to one of the registers of each of sets 1a to 1c. Flag WF is set to "1" when the corresponding register is used and is reset to "0" when the register is not used. Address AD is supplied to an address terminal of each of flag registers 5a to 5c through line 2.

Switching control circuit 6 comprises, e.g., an up-/down counter When register saving instruction PU is input in a subroutine call or a choice point, circuit 6 increments (counts up) a hold value, and when register recovery instruction PO is supplied along with returning or a back track, decrements (counts down) the value, thereby switching register set number RSN representing a register set to be currently used. Number RSN is supplied to write control circuit 7 and read control circuit 8. When the hold value is incremented, switching control circuit 6 supplies clear signal CL for clearing a write flag to a write flag register corresponding to a register set to be newly used, i.e., to one of flag registers 5a to 5c corresponding to one of sets 1a to 1c to be newly used. In accordance with number RSN supplied from circuit 6 in synchronism with write enable signal WE, write control circuit 7 supplies write enable signal WE to one of sets 1a to 1c specified by number RSN and supplies signal WE to a corresponding one of flag registers 5a to 5c as a write flag set signal. Read circuit 8 checks flag WF corresponding to a register designated by address AD in a register set (one of sets 1a to 1c) designated by number RSN supplied from circuit 6 in synchronism with read signal RS. In addition, if flag WF is "1", circuit 8 outputs output enable signal OE so that contents of the register are read out and output onto line 4. On the other hand, if flag WF is "0", circuit 8 refers to flag WF of a corresponding register of a register set (one of sets 1a to 1c) of a lower priority corresponding to a smaller number used immediately before. Circuit 8 repeatedly refers to flag WF, and when it finds a register in which flag WF is "1", outputs signal OE to a register set (one of sets 1a to 1c) including the register.

An operation of the register device according to the present invention having the arrangement shown in FIG. 1 will be described below.

Figure 2A:
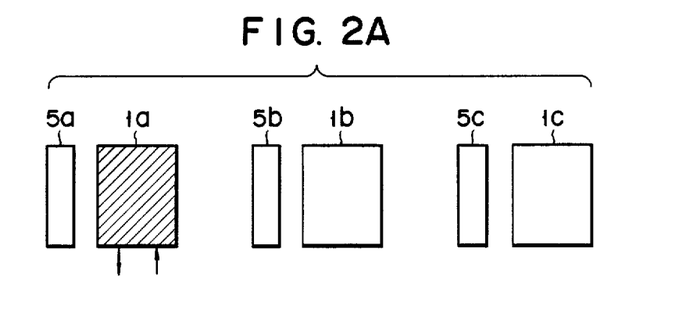
FIGS. 2A to 2F are schematic views for explaining an operation of the device shown in FIG. 1.

First, when set 1a is selected by switching control circuit 6, flag register 5a is cleared by circuit 6, and number RSN "1" is output from circuit 6 and supplied to write control circuit 7 and read control circuit 8. Circuit 7 outputs a write enable signal to set 1a in accordance with supplied number RSN. Therefore, data WD can be written in set 1a through line 3. Data WD is written in a register designated by address AD. Flag WF "1" is set in a memory area of flag register 5a corresponding to the register in which data WD is written. Therefore, the data (written in the register) can be read out from the register by signal OE supplied from circuit 8. Thus, as shown in FIG. 2A, processing in which set 1a is used is executed (in FIG. 2A, a currently used register is denoted by hatching).

Figure 2B:
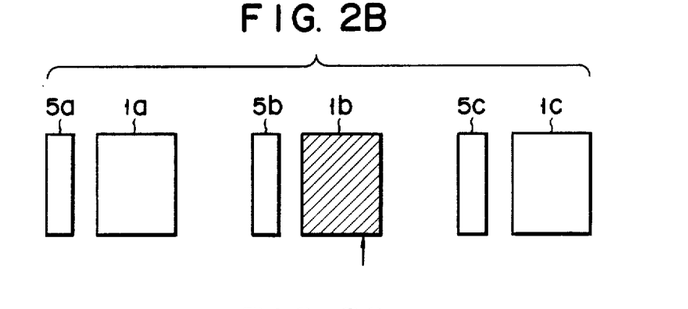
Figure 2C:
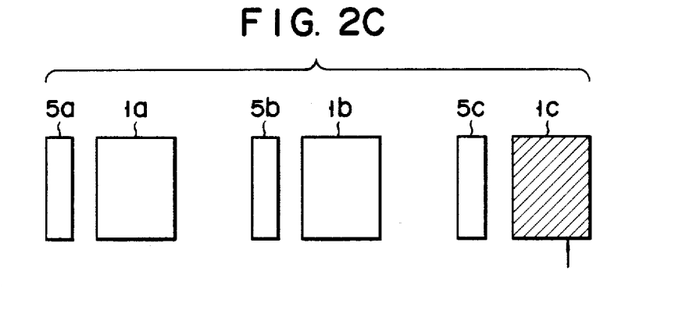

Assume that the above processing using set 1a is a main routine. In this case, if a first subroutine is called in this main routine, instruction PU is supplied to circuit 6, and circuit 6 increments the hold value to switch a register set to be used in processing from set 1a to 1b as shown in FIG. 2B. Therefore, data stored in set 1a is no longer accessed, i.e., saved. If a second subroutine is further called in this first subroutine, instruction PU is further supplied to circuit 6, and set 1c is selected as shown in FIG. 2C. In this case, the contents of set 1b are saved.

Figure 2D:
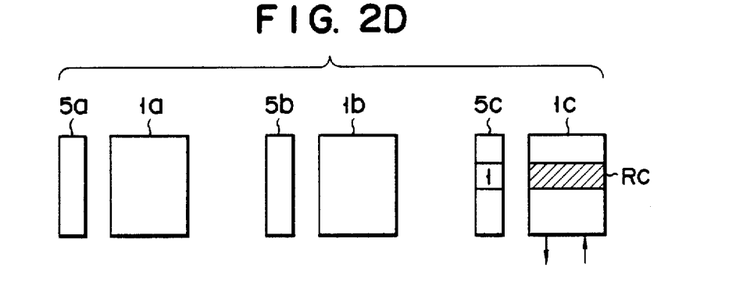
Figure 2E:
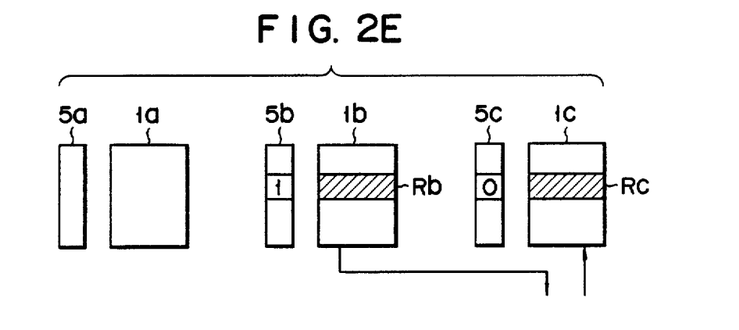
Figure 2F:
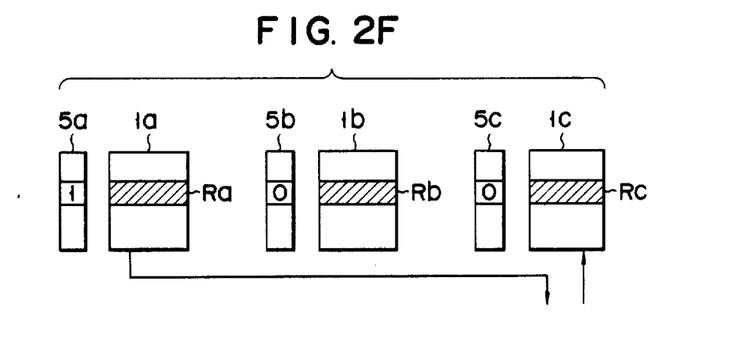

In the second subroutine, in order to refer to register Rc in set 1c as shown in FIG. 2D, flag WF corresponding to register Rc is checked. If flag WF is "1", contents of register Rc are read out. If flag WF corresponding to register Rc is "0" as shown in FIG. 2E, flag WF of register Rb in set 1b of a register number corresponding to a priority lower by one and corresponding to register Rc is referred to. If flag WF is "1", data is read out from register Rb as shown in FIG. 2E. If flags WF of both registers Rc and Rb are "0", data is read out from register Ra as shown in FIG. 2F.

As described above, even after the register set is switched, contents of a specific register of the register set before switching can be referred to unless new data is written in this register.

Figure 3:
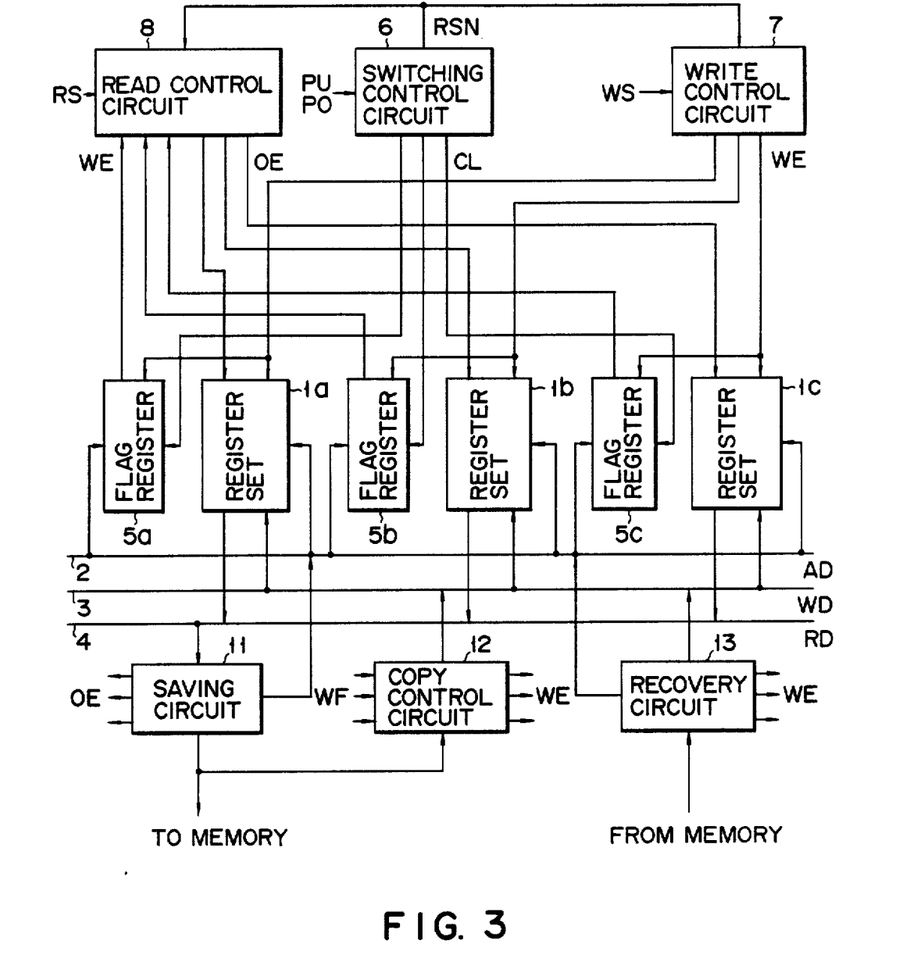
FIG. 3 is a block diagram showing an arrangement of a register device according to a second embodiment of the present invention.

Note that in the first embodiment described above, if the subroutine call or choice point processing is nested more than three steps, i.e., the number of registers, there are no more registers available. FIG. 3 is a block diagram showing an arrangement of a register device according to a second embodiment of the present invention for improving the above situation. The register device shown in FIG. 3 comprises, in addition to the same components as in the device shown in FIG. 2, saving circuit 11, copy control circuit 12, and recovery circuit 13.

Circuit 11 outputs output enable signal OE to a register set (one of register sets 1a to 1c) least recently used of currently used register sets (some or all of sets 1a to 1c), and increments register address AD sequentially from one to n (n is the number of registers) and supplies it to the above register set, thereby reading out all the data in sets 1a to 1c. Then, circuit 11 saves the readout data to a memory (not shown), typically, to a main memory of a computer system. Therefore, the register set from which the data is saved can be used in another processing.

Figure 4A:
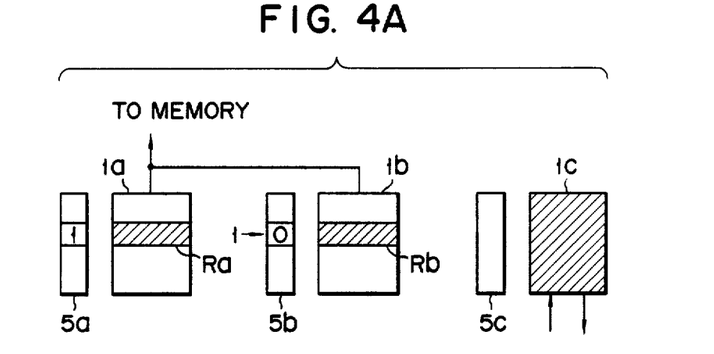
FIGS. 4A and 4B are schematic views for explaining an operation of the device shown in FIG. 3.

Assume that as shown in FIG. 2F, write flags of specific registers Rb and Rc respectively of sets 1b and 1c are both "0" and write flag WF of corresponding register Ra of set 1a is "1". In this case, if the contents of set 1a are saved by circuit 11, the contents of register Ra cannot be referred to. Copy control circuit 12 further improves the processing to cope with such a problem. When the contents of a register set are to be saved by saving circuit 11, circuit 12 refers to flag WF of the register set to be saved and flag WF of the register set of a priority lower by one (i.e., of the number larger by one) than that of the above register set. If the former write flag is "1" and the latter write flag is "0" as for the register to be saved, circuit 12 supplies write enable signal WE to the register of a lower priority so that the register of a lower priority copies the contents of the register to be saved. As a result, as shown in FIG. 4A, the contents of register Ra of set 1a are saved to the memory and simultaneously copied by corresponding register Rb of set 1b, and flag WF of register Rb, in which data is written by copying, is set to "1".

Figure 4B:
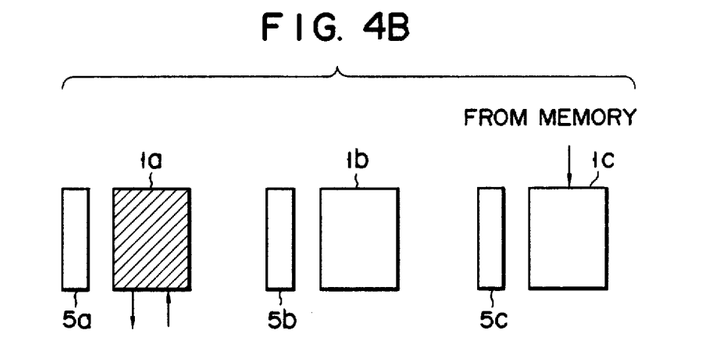

When the data saved to the memory must be returned to the register set because returning from the subroutine or a back track continues, recovery circuit 13 recovers the data as shown in FIG. 4B. Circuit 13 sequentially reads out the data saved to the memory and supplies write enable signal WE to a register set to which the data is to be recovered (typically, a register set to be accessed next by returning or a back track).

According to a register device having the above arrangement, data of a register set which is rarely used is saved to a memory, so that the register set can be used again. Therefore, for example, if the number of register sets in the device of the second embodiment is the same as that of the device of the first embodiment shown in FIG. 1, the device of the second embodiment can correspond to nesting of a subroutine of a level higher than or a choice point of a step number larger than that of the device of the first embodiment. That is, according to the device of the second embodiment, the subroutine or choice point processing of a step number equal to or more than that of the device of the first embodiment shown in FIG. 1 can be executed by a smaller number of registers.

Figure 5:
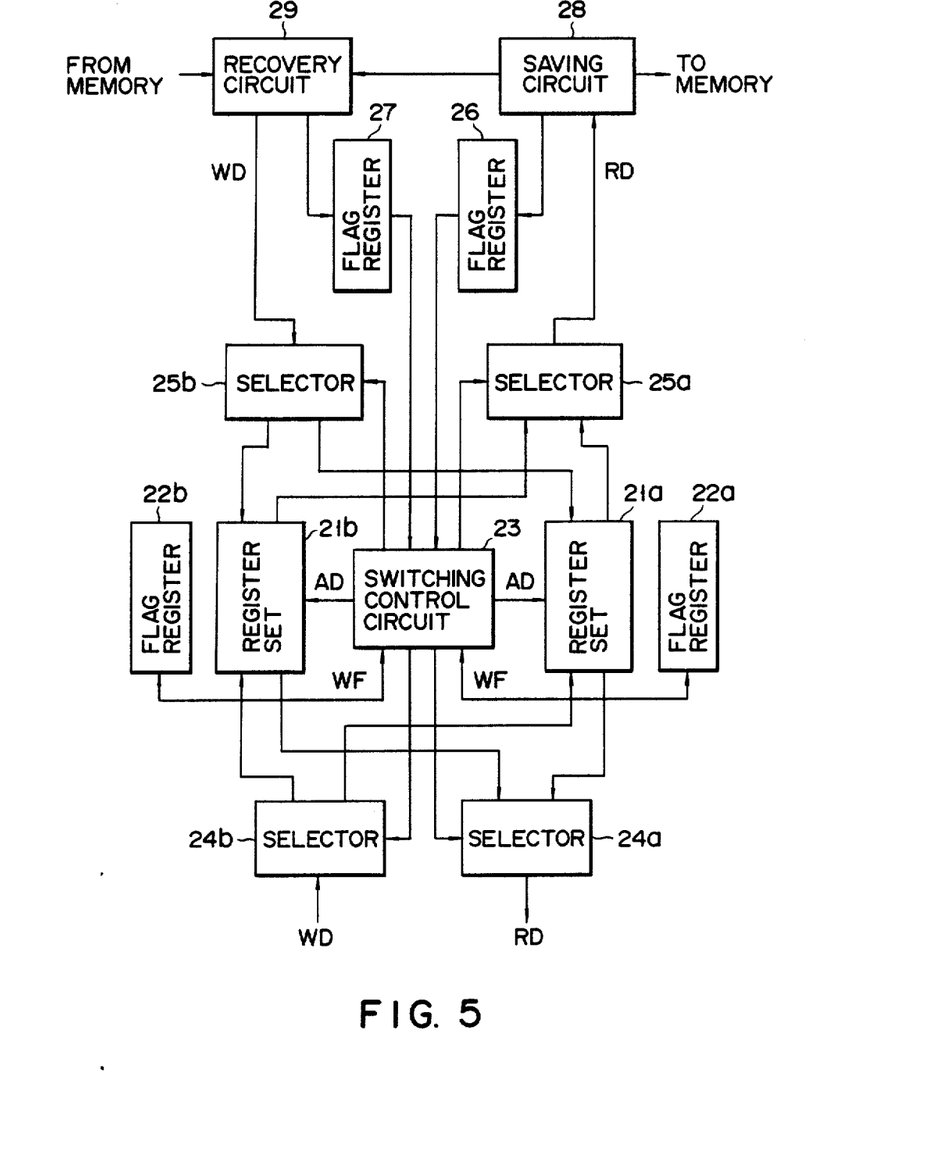
FIG. 5 is a block diagram showing an arrangement of a register device according to a third embodiment of the present invention.

FIG. 5 shows an arrangement of a register device according to a third embodiment of the present invention. The register device shown in FIG. 5 is an embodiment which effectively uses two register sets.

Register sets 21a and 21b and write flag registers 22a and 22b have substantially the same arrangements as those of register sets 1a and 1b and write flag registers 5a and 5b shown in FIGS. 1 and 3, respectively.

Switching control circuit 23 switches sets 21a and 21b during a subroutine call or in a choice point. Circuit 23 controls selectors 24a, 24b, 24c, and 24d to switch sets 21a and 21b. In addition, circuit 23 sets/resets write flags of flag registers 22a and 22b. In order to switch sets 21a and 21b, circuit 23 refers to flag registers 22a and 22b or saving flag register 26 and recovery flag register 27 to be described later. Circuit 23 supplies register address AD to sets 21a and 21b. Saving circuit 28 saves data selected by selector 25a to a memory (not shown). Recovery circuit 29 reads out the data saved to the memory and stores it in a register set selected by selector 25b. Saving flag register 26 holds a saving flag representing that a saving operation is being executed, and this saving flag is set by circuit 28 during the saving operation The saving flag is referred to by circuit 23. Recovery flag register 27 holds a recovery flag representing that a recovery operation is being executed, and this recovery flag is set by circuit 29 during the recovery operation. The recovery flag is referred to by circuit 23. By referring to the above flags, a switching operation of the register set during the saving and recovery operations is prevented.

An operation of the register device having the arrangement shown in FIG. 5 will be described below.

Figure 6A:
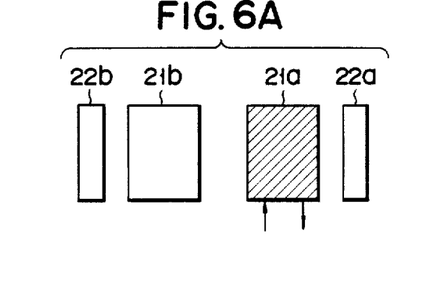
FIGS. 6A to 6H are schematic views for explaining an operation of the device shown in FIG. 5.
Figure 6B:
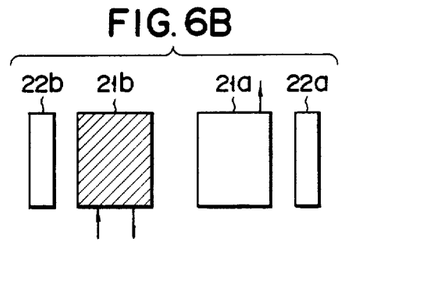
Figure 6C:
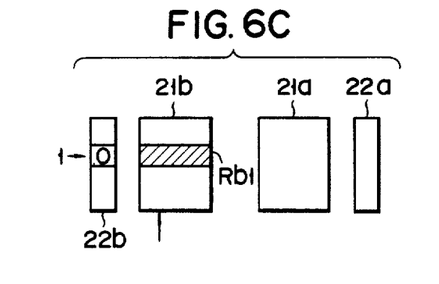
Figures 6D, 6F:
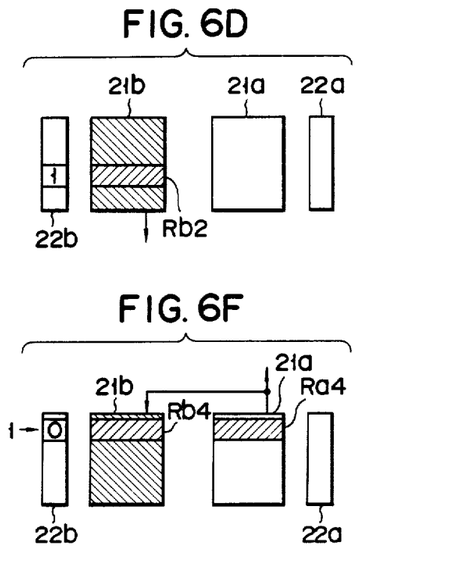
Figure 6E:
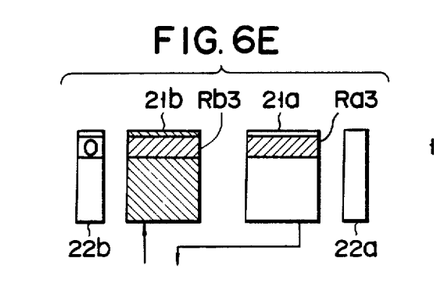

Assume that, e.g., a subroutine call is generated when set 21a is used as shown in FIG. 6A. In this case, a register set to be used is switched to set 21b as shown in FIG. 6B, and the contents of set 21a are saved. In this state, as shown in FIG. 6C, when data is written in register Rb1 of set 21b through selector 24b, a write flag is set to "1". On the other hand, as shown in FIG. 6D, assume that the contents of register Rb2 of set 21b are to be read out. In this case, if a write flag of register Rb2 is "1", its contents are read out. However, as shown in FIG. 6E, if a write flag of register Rb3 of set 21b from which contents are to be read out is "0", data is read out from corresponding register Ra3 of set 21a. Thus, even immediately after the register set is switched, the contents of the register set used before switching can be read out.

Note that during saving of the register contents to the memory, a write flag of the currently used register set is referred to. In this case, as for a register corresponding to a register in which the write flag is "1", only a saving operation is performed. However, as shown in FIG. 6F, as for register Ra4 of set 21a corresponding to register Rb4 in which a write flag is "0", contents of register Ra4 are saved to the memory. At the same time, the contents of register Ra4 are copied to corresponding register Rb4 of set 21b, and a write flag of register Rb4 is set to "1". When the register contents are saved as described above, all information of set 21a is copied to set 21b except for the newly written register contents in set 21b.

Figure 6G:
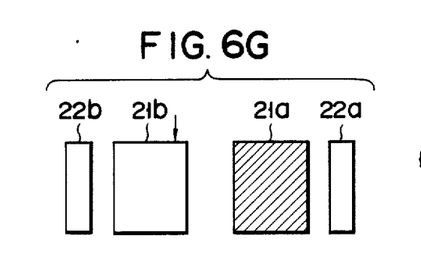

When a register set must be recovered because of returning from the subroutine or a back track while set 21b is used, the contents of the register are instantaneously recovered by only switching from set 21b, which is currently used, to set 21a, which is previously used, as shown in FIG. 6G. In this case, while set 21a is used, contents (in this case, saved to the memory) of set 21b which is to be selected by the next returning or back track are recovered from the memory.

Figure 6H:
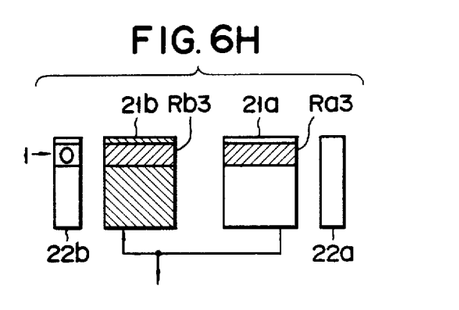

Note that when the contents are to be read out from register Rb3 in which the write flag is "0" as shown in FIG. 6E, the contents may be read out from register Ra3 of set 21a and copied to register Rb3 of set 21b to set a write flag corresponding to register Rb3 to "1", as shown in FIG. 6H.

Figure 7:
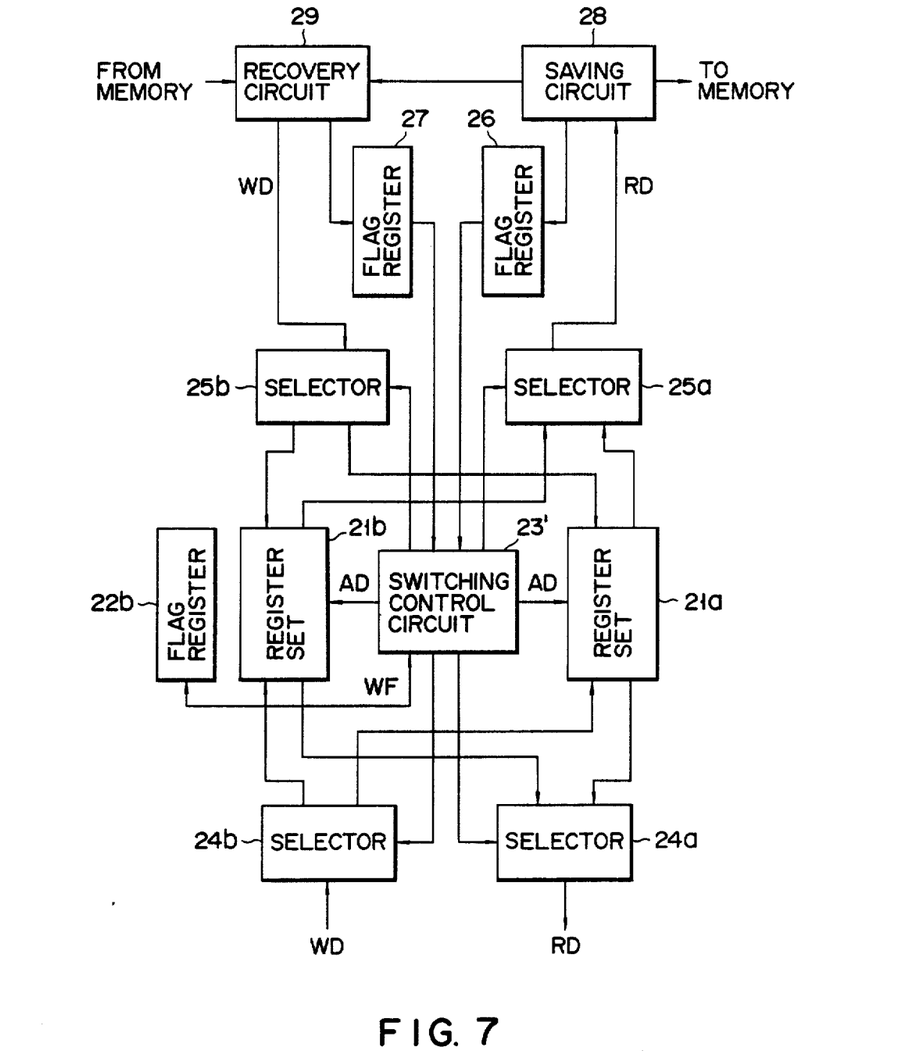
FIG. 7 is a block diagram showing an arrangement of a register device according to a fourth embodiment of the present invention.

In this case, if the contents of a register in which a write flag is "0" are always copied from a corresponding register, the write flag of only one of the registers need be referred to. Therefore, in a register device according to a fourth embodiment of the present invention shown in FIG. 7, write flag register 22a included in the arrangement shown in FIG. 5 is omitted, and only one write flag register 22b is provided. During switching of the register set, switching control circuit 23' always transfers the contents of the registers into a newly selected register set from the other, and sets a write flag of the register to "0". When data is written in the register, sets the write flag to "1". With this arrangement, circuit 23' need only refer to the write flag of one of the register sets. According to the register device of the fourth embodiment, the same effect as that obtained by the register device shown in FIG. 5 can be obtained, and the arrangement is further simplified.

What is claimed is:

1. A register device comprising:
   a register set group consisting of a plurality of prioritized register sets each constituted by a plurality of registers, said register sets having an equal number of said registers;
   switching control means for receiving a saving/ recovery instruction and selecting a current register set to be used from said register set group to store data from a write signal line, in accordance with said saving/recovery instruction, a register set of lower priority than said current register set being no longer accessed, thereby saving data that is stored in said lower priority register set;
   write control means for writing, in response to a write instruction, data into a register of said current register set selected by said switching control means;
   write flag memory means for holding a write flag representing whether data is written in each of said registers; and
   read control means for determining, in response to a read instruction, a register in which data is written most recently, from among said plurality of registers with reference to said write flags, and for reading out data from said register.

2. A register device comprising:
   a register set group consisting of a plurality of prioritized register sets each constituted by a plurality of registers, said register sets having an equal number of said registers;
   switching control means for receiving a saving/ recovery instruction and selecting a current register set to be used from said register set group to store data from a write signal line, in accordance with said saving/recovery instruction, a register set of lower priority than said current register set being no longer accessed thereby saving data that is stored in said lower priority register set;
   write control means for writing, in response to a write instruction, data into a register of said current register set selected by said switching control means;
   write flag memory means for holding a write flag representing whether data is written in each of said registers;
   read control means for determining, in response to a read instruction, a register in which data is written most recently, from among said plurality of registers with reference to said write flags, and for reading out data from said register;
   saving means for operating in association with the saving instruction to save data in the previously used register set to a main memory; and
   recovery means for operating in association with the recovery instruction to recover the data already saved by said saving means to said register set.

3. A device according to claim 2, wherein said saving means includes transferring means for transferring, where all of said register sets are saved except for a currently used register set, data in a least recently used register set to said main memory.

4. A device according to claim 3, wherein said saving means comprises means for saving the data to said main memory in response to the saving instruction.

5. A device according to claim 2, wherein said saving means includes copying means for copying, when data is saved to said main memory, the data to a register of lower priority in which no data is written.

6. A device according to claim 2, wherein said recovery means includes transferring means for transferring data saved to said main memory by said saving means from said main memory to a register set to be selected by said switching control means in response to the next recovery instruction.

7. A device according to claim 6, wherein said recovery means includes means for recovering data from said main memory in response to the next recovery instruction.

8. A device according to claim 2, wherein said register set group is constituted by a pair of register sets.

9. A device according to claim 2, wherein said register set group is constituted by a pair of register sets, said write flag memory means corresponds to only one of said register sets, holds a write flag representing whether data is written in each of said registers of the currently used register set and corresponding to said one of register sets, and comprises copying means for copying, when the register set is switched by said switching control means, the contents of the most recently used register set to the newly selected register set.

* * * * *